Aug. 30, 1955    J. J. ROARK    2,716,733
VARIABLE BANDWIDTH BAND-PASS FILTER
Filed May 10, 1950    4 Sheets-Sheet 1

James J. Roark    Inventor
By W. O. T Heilman    Attorney

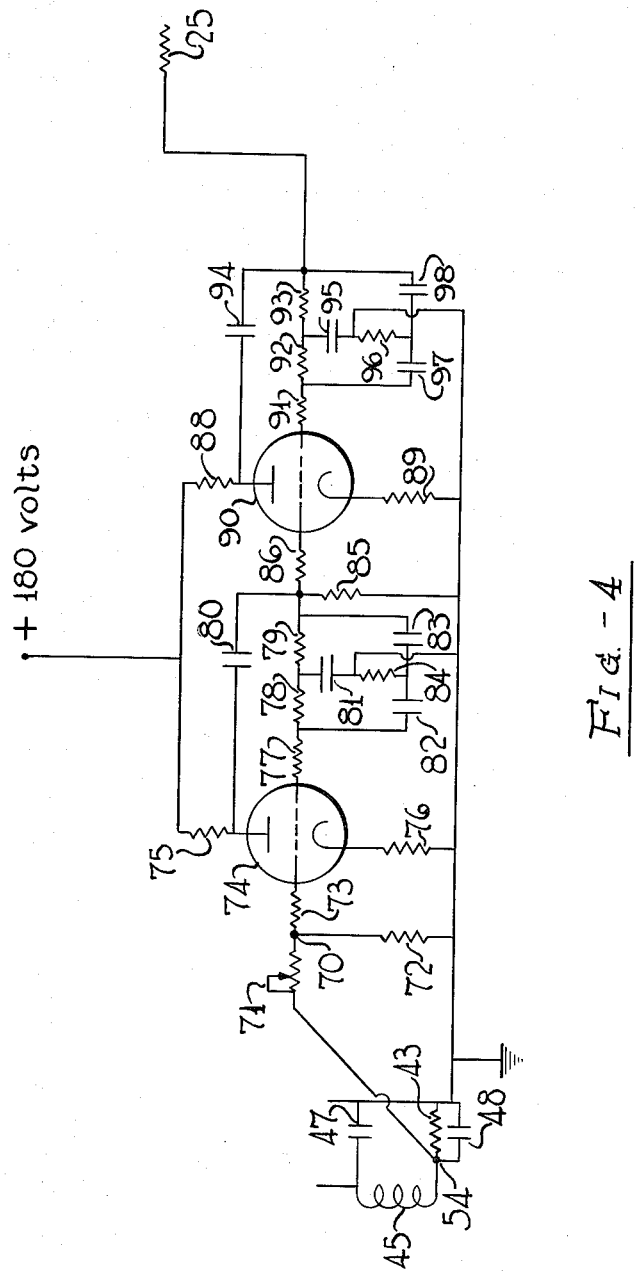

United States Patent Office 2,716,733
Patented Aug. 30, 1955

2,716,733

VARIABLE BANDWIDTH BAND-PASS FILTER

James J. Roark, Tulsa, Okla., assignor to Esso Research and Engineering Company, a corporation of Delaware Application May 10, 1950, Serial No. 161,177

7 Claims. (Cl. 333—75)

The present invention relates to an improved band-pass filter for electronic circuits. More particularly, the invention concerns a band-pass filter of variable bandwidth but having essentially constant time delay characteristics regardless of the bandwidth.

In many applications of electronic amplifier circuits wherein wave filter sections are employed it is necessary or advantageous to employ filters of variable bandwidth. One use of such a variable filter is in the amplifier circuit of a seismograph employed in seismic prospecting for oil or other mineral deposits; wherein an explosive charge is detonated in a shot hole and the motion of the earth from the resulting seismic disturbance is detected at a number of points spread out in a desired pattern from the shot hole, sensitive pickups or geophones being employed to translate the detected motion into electrical impulses which after suitable amplification are recorded on a seismograph. Conventionally, a seismograph record is obtained by means of a number of moving coil galvanometers each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, suitably amplified, and fed to the galvanometers. The strip of paper or film is moved longitudinally at a substantially constant speed and is provided by well known means with suitable timing marks so that when the seismograph record or seismogram is later examined it is possible to determine the length of time required for the arrival of seismic waves at any particular point on the earth's surface either directly from the source or by reflection from underlying strata. From other data obtained in the area being studied, such as seismic wave velocities in the various earth layers, it is then possible to estimate the depths of the various reflecting substrata.

The amplifier circuits employed in the seismograph instruments used in prospecting are commonly provided with a number of filter networks with provisions for selecting those best suited for suppression of spurious signals, in the particular locality being profiled. These signals include high frequency noises such as wind noise and low frequency noise such as what is commonly called "ground roll." When designing filters for seismic prospecting equipment it is desirable to provide for maintenance of a constant time delay for all frequencies passed by the filter. The reason for this is that if the time delay varies as the filter characteristics are changed, the seismic record will be in error as regards the arrival time of indicated reflections, thus necessitating the use of correction factors. Although it is possible to design a band-pass filter circuit having constant time delay using either feedback amplifier circuits or the familiar lattice structure, filters of this type have the disadvantage that, in order to change the bandwidth of the filter, an excessive amount of switching and of substitution of filter elements is required.

Accordingly, it is one object of the present invention to provide a band-pass filter whose bandwith can be adjusted while its time delay characteristics remain unaltered. It is a further object of the invention to provide such a variable bandwidth filter in which the bandwidth can be varied readily without requiring an undue number of filtering elements, excessive switching and the like.

In accordance with the present invention a variable bandwidth band-pass filter is constructed by combining a number of sharply tuned circuits, such as would be obtained from a resonant inductance-capacitance circuit or a parallel T feedback circuit, in such a manner that they have both inputs and outputs in parallel but with isolation means provided in the output circuits so that one circuit cannot influence any of the others and with the peak frequencies of the tuned circuits spaced so that the sum of the individual response curves will approximate a flat-topped band-pass filter. In order that all components of the filter will add in phase, a suitable time delay is inserted in each branch of the circuit. This feature makes it possible to change the shape of the amplitude response curve of the filter without a corresponding change in time delay.

The nature and objects of this invention and the manner in which it is to be performed will be more clearly understood from the ensuing description when taken in conjunction with the accompanying drawings in which:

Figure 4 is a circuit diagram showing a representative gain control and filter network comprising one unit of the block diagram of Figure 3.

Figure 1:
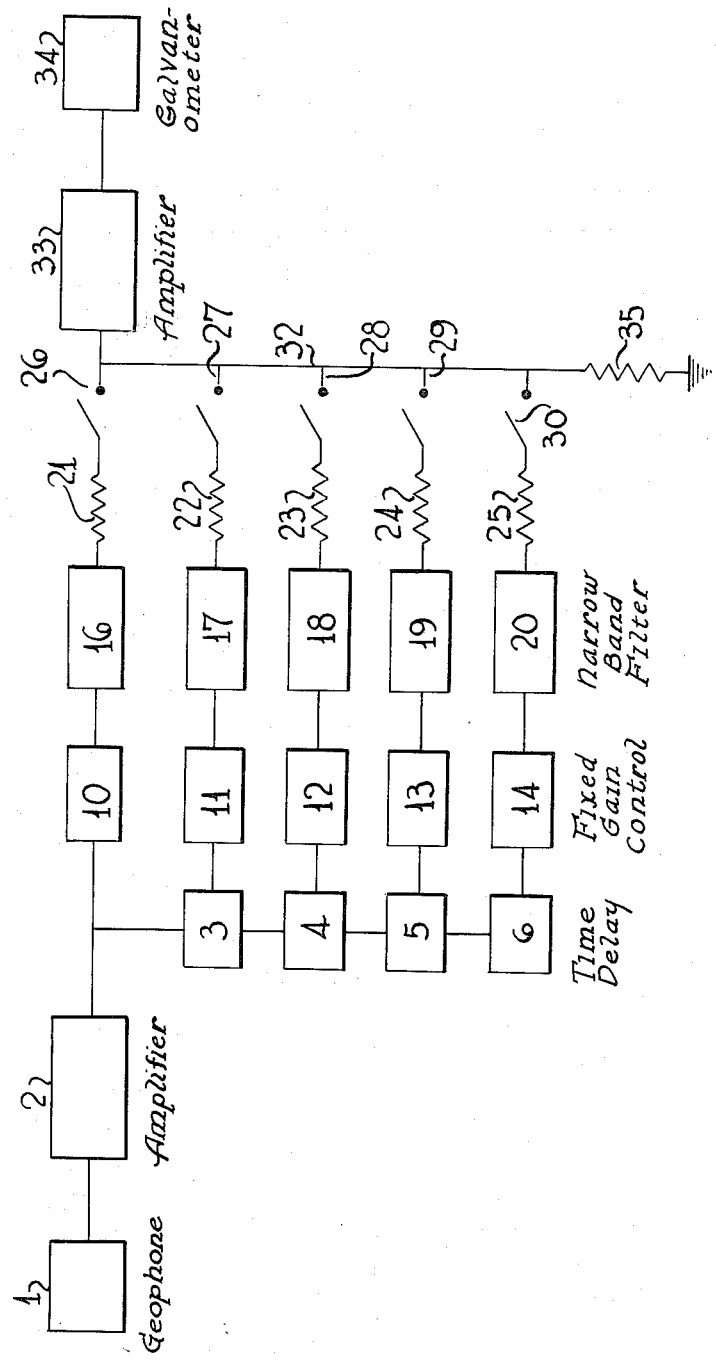
Figure 1 is a schematic block diagram of the filter arrangement in conjunction with an amplifier circuit of a recording galvanometer employed in seismic prospecting.

With particular reference to Figure 1, the output from a geophone 1 is fed into a first amplifier 2 whose output is connected in parallel to a plurality of time delay networks 3, 4, 5 and 6 and to a fixed gain control circuit 10. The outputs of each of the time delay networks is likewise connected to a fixed gain control circuit 11, 12, 13 and 14. The outputs of each of the gain control circuits are connected to narrow band filters 16, 17, 18, 19, and 20, whose outputs are in turn connected through fixed resistors 21 to 25 and switches 26 to 30 to line 32 which feed into the input of a second amplifier network 33 and thence to a recording galvanometer 34. The relationship of time delays 3 to 6 to filters 16 to 20 is such that the time delay introduced is greater as the bandpass frequency increases.

Line 32 is tied to the common ground of the circuit through resistor 35, which, it will be seen, serves as the common resistor of a resistance mixing network. Amplifier 2 may be of any suitable design, its function being to amplify the incoming signal to a level suitable for recording on the seismograph. It may have an amplification factor of, say, 100 to 3000 and may be provided with time-variable gain control as is common practice in the seismic prospecting art. Amplifier 33 may have an amplification factor of about 300 to 500 and may be provided with an automatic gain control loop.

Figure 2:
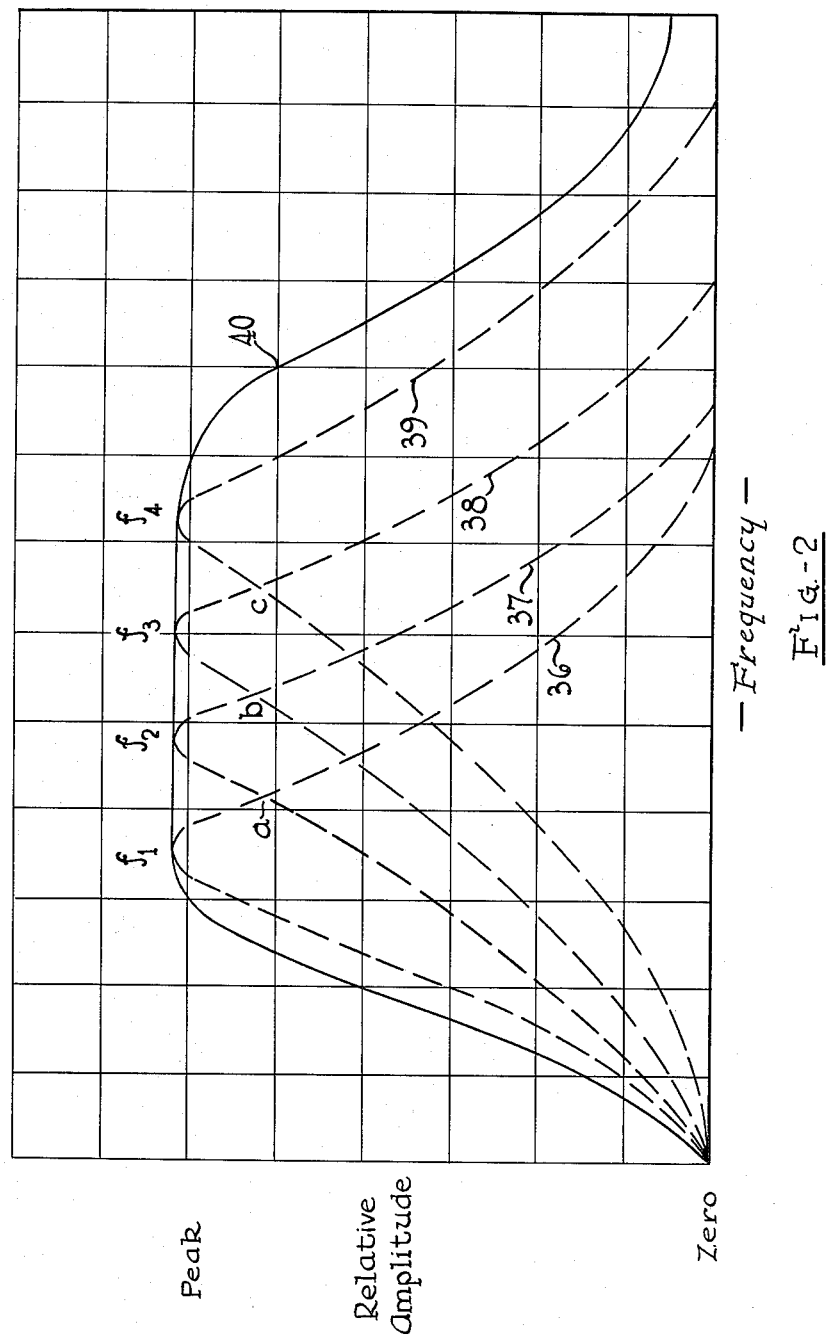
Figure 2 is a graphical representation of the relationship between adjacent narrow band filters in the diagram of Figure 1.

By suitable selection of switches 26 to 30 the outputs of the various narrow band filters 16 to 20 may be added together in any desired combination. It is essential, however, in order to obtain the benefits of this invention, that only adjacent filters be so connected. Thus the outputs of filters 16, 17 and 18 of 17, 18 and 19, of 16 and 17 etc. may be added together. Furthermore, it is preferred that all of the narrow band filters 16 to 20 be of substantially the same relative band width, the latter being defined as the ratio of the band frequency to the peak frequency of the filter. For the most satisfactory operation, the average relative bandwidth should not exceed about 0.4 and, preferably, variation in individual bandwidths of the group of filters should not be greater than about 5 per cent of the mean i. e. if the average relative bandwidth of the group is 0.3, then the narrowest bandwidth should not be lower than about 0.25 and the widest bandwidth not wider than about 0.35. The lower limit for average bandwidth of the individual narrow band filter is determined by economic considerations; since the narrower the bandwidth of the individual filters the more individual narrow band filters will be required. This will have the advantage, however, of making the phase-shift-versus-frequency characteristics of the filter more linear. It is also essential in order to procure the desired effect that a certain overlap in the bandwidths of adjacent filters be provided for. The proper relationship is shown graphically in Figure 2 wherein a plot of frequency versus amplitude response of a group of narrow band filters is presented. For convenience, filter 16 is identified in Figure 2 as $f_1$, filter 17 as $f_2$, filter 18 as $f_3$, etc. In order that the sum of the individual response curves 36, 37, 38 and 39 will approximate a flat-topped bandpass filter having a response curve of the nature shown by curve 40, it is necessary that the peak frequency of the individual filters $f_1$ and $f_2$ etc. be so spaced that the response curves will overlap as at points $a$, $b$ and $c$, these points lying somewhere between 50 and 70% of the amplitude scale from zero amplitude to the peak amplitude of the filters.

If all of the narrow band filters have substantially the same relative bandwidth, which is the preferred case, the time lag introduced by each filter will be inversely proportional to its peak frequency; thus by adding a suitable time delay 3, 4, 5 and 6, as shown in Figure 1 the various components of the overall circuit can be made to add in phase and there will be a constant time delay through each branch of the circuit. This feature makes it possible to change the shape of the amplitude response curve without introducing a corresponding change in time delay.

Figure 3:
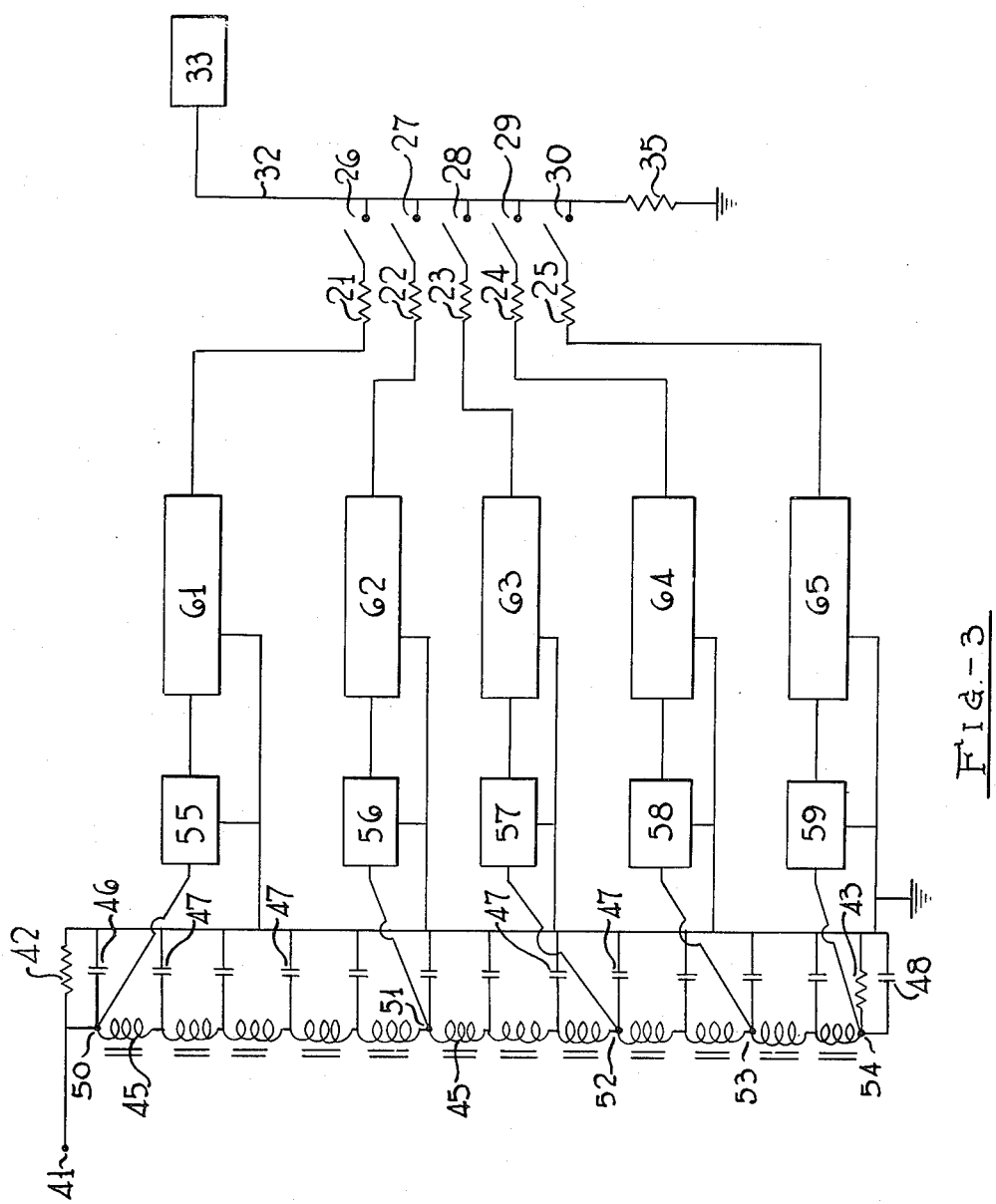
Figure 3 is a block diagram of a preferred embodiment of the invention.

A preferred embodiment of the invention is shown in the block diagram of Figure 3. The input voltage, for example the voltage obtained from the output of amplifier 2 of Figure 1, is fed through terminal 41 into a time delay chain comprising a bank of inductances 45 tied together in series with the terminal point between adjacent inductances being tied to the common ground of the circuit through a capacitor 47. One end terminal 50 of the bank is tied to the ground through capacitor 46 and resistor 42 and the other end terminal 54 is tied to ground through capacitor 48 and resistor 43. Terminal 50 is also tied to fixed gain control 55. Fixed gain controls 56, 57, 58 and 59 are connected into the bank of inductances 45 at terminal points 51, 52, 53 and 54. Each of the gain controls is connected to a filter network 61 to 65 and the outputs of the latter are in turn each connected to isolating resistors 21 to 25 and switches 26 to 30 as in Figure 1. The manner in which the bank of inductances, the various fixed gain controls and the various narrow band filters are tied together will be more fully understood from Figure 4. It will be seen from Figure 3 that the input voltage impressed on terminal 41 will be fed into the gain control 55 and filter 61 without any added time delay whereas the voltage fed into gain control 56 and filter 62 will be subjected to a time delay factor introduced by the capacitor-inductance network lying between terminals 50 and 51. Likewise the voltage fed into gain control 57 and filter 63 will be subjected to a time delay factor introduced by the capacitor-inductance bank lying between terminals 50 and 52. In the same manner, longer time delays will be introduced into the voltages impressed on gain controls 58, 59 and filters 64 and 65.

A specific circuit constituting gain control 59 and filter 65 is presented in Figure 4. It will be seen that gain control 59 comprises a voltage divider consisting of variable resistor 71 and fixed resistor 72, the former being tied to terminal 54 and the latter being tied to the common ground of the circuit.

Filter network 65 consists of a pair of feedback filter circuits connected in series. These circuits comprise amplifier triodes 74 and 90 together with parallel-T filters. The latter consist, respectively, of resistors 78, 79 and 84 and capacitors 81, 82 and 83 and of resistors 92, 93 and 96 and capacitors 95, 97 and 98. The grid of triode 74 is tied to terminal 70 of the voltage divider through isolating resistor 73. Similar isolating resistors 77, 86 and 91 are inserted between the triodes and the parallel-T filters. The plates of triodes 74 and 90 are tied to a source of B potential, for example +180 volts, through plate load resistors 75 and 88.

Gain controls 55 to 58 and filter networks 61 to 64 will be hooked up in a similar manner but will differ from the circuit of Figure 4 in the specific values of the capacitors of the parallel-T filters. As a specific example of an operable circuit for use with recording galvanometers for seismic prospecting equipment the circuit of Figs. 3 and 4 may have the following values: Resistors 73, 77, 78, 79, 86, 91, 92 and 93 as well as isolating resistors 21 to 25 may all have resistance values of 2 megohms. Variable resistor 71 will likewise have a maximum resistance of 2 megohms. Plate load resistors 75 and 88 may have resistances of 0.24 megohm and grid return resistors 72 and 85 resistance values of 3 megohms. Cathode bias resistors 76 and 89 may have resistance values of 3000 ohms and resistors 84 and 96 resistance values of 1 megohm. Coupling condensers 80 and 94 may have capacitances of 0.5 microfarad. The capacitors in the various parallel-T filters may have values as shown in the following table. In each case the capacitor values are given in microfarads.

| Filter | Capacitors | | | |
|---|---|---|---|---|
| | 81 | 82-83 | 95 | 97-98 |
| 61 | .00825 | .00412 | .00586 | .00293 |
| 62 | .00511 | .00255 | .00404 | .00202 |
| 63 | .00364 | .00182 | .00288 | .00144 |
| 64 | .00259 | .00129 | .00204 | .00102 |
| 65 | .00184 | .00092 | .00146 | .00073 |

The triodes employed may be 12AX7 vacuum tubes. The setting of variable resistor 71 in each branch of the circuit will be such as to give the desired fixed gain control in that particular branch. The inductances 45 in the inductance-capacitance bank comprising the time delay network may all have inductances of 250 henries. Capacitors 46 and 48 will have capacitance values of .0115 microfarad and all the capacitors 47 will have values of .023 microfarad. Resistors 42 and 43 will have resistances of 0.1 megohm. For the proper functioning of the resistance mixing network comprising resistors 21 to 25 and resistor 35, it is preferred that resistor 35 have a resistance of the order of 1/10 or less of that of each of the resistors 21 to 25.

The function of the gain control comprising variable resistor 71 and fixed resistor 72 is to attenuate the signal fed into the filter so that the amplitude of the signal leaving the filter will be essentially the same as that of each of the signals from the other filters with which it is combined. Since each of the filters 61 to 65 will have different gain characteristics, the gains can be equalized by furnishing various degrees of attenuation through gain controls 55 to 59. This feature also makes it possible to compensate for losses in amplitude that occur in the various stages of the time delay chain comprising inductances 45 and their associated elements. Obviously, gain controls 55 to 59 in Figure 3 (and 10 to 14 in Figure 1) can be omitted when time delay means having no loss is employed and when the various filters all have the same gain characteristics.

Although five circuit branches are shown in Figure 3 it is to be understood that a greater number, or as few as three, may be employed in this invention provided, of course, that the adjacent branches bear the proper relationship to each other as set forth above. It is to be observed, in this connection, that the limitation that each branch, that is, each of the narrow bandpass filters, have a relative bandwith not greater than 0.4 is essential since such narrow bandpass filters will each have substantially constant time delay for all frequencies within its pass band.

Briefly, in recapitulation, it may be stated that this invention involves a variable bandpass filter, having constant time delay for all bandwidths, comprising a plurality of sharply tuned narrow bandpass filter sections of overlapping bandwidths, increasing in bandpass frequency through the series, each of the narrow bandpass filter sections having substantially constant time delay for all frequencies within its pass band, a resistance mixing network for isolating each filter section from the other filter sections with which it is combined, means for combining the outputs of any selected group of adjacent filter sections, and time delay means associated with the narrow bandpass filter sections having time delay characteristics which will cause the combined signals to add in phase, the time delay means being so designed that increasingly long time delay will be introduced with increased individual bandwidth frequency.

The invention also involves a method of filtering an amplified electrical transient which comprises dividing the transient into selected frequencies, passing the divided frequencies through overlapping narrow bandpass filters each of which has substantially constant time delay for all frequencies within its pass band, subjecting the divided frequencies to time delays selected to add the various frequencies in phase when they are recombined and recombining the frequencies filtered through selected adjacent filters.

It is to be understood that the scope of this invention is to be determined by the following claims and not merely by the specific embodiments described herein, which have been given by way of example only.

What is claimed is:

1. A variable bandwidth bandpass filter network comprising a series of sharply tuned narrow bandpass filter sections of overlapping bandwidths, increasing in bandpass frequency through the series, all of said filter sections being connected to a common input, each of said filter sections having substantially constant time delay for all frequencies within its pass band, time delay means associated with the narrow filter sections adapted to supply increasingly long time delay with increased individual bandwidth frequency and to add the outputs of said filter sections in phase when said outputs are combined, means for connecting the outputs of selected adajcent filter sections and means associated with the output of each filter section adapted to isolate said filter section from the other filter sections with which it is combined.

2. Network according to claim 1 in which all of the narrow bandpass filters have essentially the same relative bandwidth and in which adjacent filters have amplitude versus frequency response curves that overlap at points lying in the range of from about 50 to about 70 percent of an amplitude scale plotted from zero amplitude to peak amplitude.

3. Network according to claim 2 in which the average relative bandwidth of the narrow band filters is not greater than 0.4.

4. A variable bandwidth bandpass filter network comprising a time delay circuit provided with an input tap and a plurality of output taps, each successive output tap providing increasingly long time delay from said input tap, a series of narrow bandpass filters of overlapping bandwidths, increasing in bandpass frequency through the series, each of said filters being connected to one of said output taps so as to provide increasingly long time delay with increased individual bandpass frequency, each of said narrow bandpass filters having substantially constant time delay for all frequencies within its pass band, and a resistance mixing network comprising a common outlet lead tied to ground through a fixed resistor and a plurality of isolating resistors tied in parallel to said outlet lead through separate switching means, the output of each of said narrow bandpass filters being tied to one of said isolating resistors.

5. Network according to claim 4 in which the time delay circuit comprises a bank of inductances of equal value tied together in series, a plurality of capacitors of equal capacitance tying each point of contact of adjacent inductances to the common ground of the circuit, an additional pair of capacitors tying each terminal of the inductance bank to said common ground and a pair of resistors tying each of said terminals to said common ground, selected points of contact of adjacent inductances and each terminal of said inductance bank comprising said output taps.

6. Network according to claim 4 including attenuating gain control means associated with each of said narrow bandpass filters adapted to adjust the effective gain of the output signal from each of said filters to substantially the same value.

7. A bandpass filter, having variable bandwidth and constant time delay, comprising a plurality of sharply tuned narrow bandpass filter sections of overlapping bandwidth, a resistance mixing network tying the outputs of said filter sections in parallel, and a time delay network provided with an input tap and a plurality of output taps, each successive output tap providing increasingly long time delays from said input tap, each of said narrow band filters having its input tied to a time delay output tap selected to make the filtered signals entering the resistance mixing network add in phase, taps representing increasingly longer time delay being tied to filter sections of increasingly higher bandpass frequency, said resistance mixing network being provided with means for selectively connecting the outputs of any desired group of adjacent filter sections.

References Cited in the file of this patent
UNITED STATES PATENTS

| Number | Name | Date |
| --- | --- | --- |
| 1,576,459 | Pierce | Mar. 9, 1926 |
| 1,681,252 | Nyquist | Aug. 21, 1928 |
| 1,944,297 | Nyquist | Jan. 23, 1934 |
| 2,102,138 | Strieby | Dec. 14, 1937 |
| 2,209,100 | Minton | July 23, 1940 |
| 2,226,728 | Lalande et al. | Dec. 31, 1940 |
| 2,340,364 | Bedford | Feb. 1, 1944 |
| 2,417,069 | Farkas | Mar. 11, 1947 |
| 2,481,247 | Schott | Sept 6, 1949 |

FOREIGN PATENTS

| Number | Country | Date |
| --- | --- | --- |
| 541,251 | Great Britain | Nov. 19, 1941 |